United States Patent [19]

Petschow et al.

[11] Patent Number: 5,550,106
[45] Date of Patent: Aug. 27, 1996

[54] LOW BUFFER NUTRITIONAL COMPOSITION

[75] Inventors: Bryon W. Petschow; Yung-Hsiung Lee, both of Evansville, Ind.

[73] Assignee: Bristol-Myers Squibb Company, New York, N.Y.

[21] Appl. No.: 206,555

[22] Filed: Mar. 4, 1994

[51] Int. Cl.$^6$ ............................................. A61K 38/01
[52] U.S. Cl. ........................ 514/2; 424/535; 426/72; 426/590; 426/657; 426/658; 426/800; 426/801; 514/23; 514/54; 514/867; 514/878
[58] Field of Search ................... 514/2, 23, 54, 514/867, 878; 426/72, 590, 657, 658, 800, 801; 424/535

[56] References Cited

U.S. PATENT DOCUMENTS

| | | | |
|---|---|---|---|
| 4,497,800 | 2/1985 | Larson et al. | 426/72 |
| 4,670,268 | 6/1987 | Mahmoud | 426/72 |
| 4,921,877 | 5/1990 | Cashmere et al. | 514/866 |
| 5,104,677 | 4/1992 | Behr | 426/590 |
| 5,223,285 | 6/1993 | DeMichele et al. | 426/72 |

OTHER PUBLICATIONS

Janine M. Jason, et al., "Mortality and Infectious Disease Associated with Infant–Feeding Practices in Developing Countries," *Pediatrics*, 74(Suppl), 1984, 702–727.

Mary Grace Kovar, et al., "Review of the Epidemiologic Evidence for an Association Between Infant Feeding and Infant Health," *Pediatrics, 74(Suppl), 1984, 615–638.*

B. S. Draser, et al., "Studies on the Intestinal Flora. I. The bacterial flora of the gastrointestinal tract in healthy and achlorhydric persons," *Gastroenterology*, 56, 1969, 71–79.

Ralph A. Giannella, et al., "Influence of Gastric Acidity on Bacterial and Parasitic Enteric Infections," *Annals of Internal Medicine*, 78, 1973, 271–276.

Richard A. Cash, et al., "Response of Man to Infection with *Vibrio cholerae*. I. Clinical Serologic, and Bacteriologic Responses to a Known Inoculum," *The Journal of Infectious Diseases*, 129, 1974, 45–52.

Dennis L. Christie, "Development of Gastric Function During the First Month of Life," *Textbook of Gastroenterology and Nutrition in Infancy*, E. Lebenthal (ed.), Raven Press, New York, 1981, 109–120.

Julius S. Deren, "Development of structure and function in the fetal and newborn stomach," *The American Journal of Clinical Nutrition*, 24, 1971, 144–159.

Mona Agunod, et al., "Correlative Study of Hydrochloric Acid, Pepsin, and Intrinsic Factor Secretion in Newborns and Infants," *American Journal of Digestive Diseases*, 14, 1969, 400–414.

Anna G. Usowicz, et al., "Does gastric acid protect the preterm infant from bacteria in unheated human milk?" *Early Human Development*, 16, 1988, 27–33.

Peter A. Mayes, "Digestion/Absorption in the Gastrointestinal Tract," *Harper's Review of Biochemistry*, 19th Edition, Davod W. Martin, et al., editors, Lange Medical Publications, Los Altos, 1983, pp. 546–558.

C. L. Bullen, et al., "The Effect of 'Humanised' Milks and Supplemented Breast Feeding on the Faecal Flora of Infants," *The Journal of Medical Microbiology*, 10, 1977, 403–413.

David J. Hentges, et al., "Influence of Infant Diets on the Ecology of the Intestinal Tract of Human Flora–Associated Mice," *Journal of Pediatric Gastroenterology and Nutrition*, 14, 1992, 145–152.

Celeste Weiss and H. Fred Clark, "Rapid Inactivation of Rotaviruses by Exposure to Acid Buffer or Acidic Gastric Juice," *J. Gen. Virol.*, 66, 1985, 2725–2730.

Jed Gorden and P. L. C. Small, "Acid Resistance in Enteric Bacteria," *Infection and Immunity*, 61, 1993, 364–367.

O. Brunser et al., "Effect of an Acidified Milk on Diarrhoae and the Carrier State in Infants of Low Socio–Economic Stratum," *Acta. Paediatric Scand.*, 78, 1989, 259–264.

H. Fred Clark, et al., "Protective Effect of WC3 Vaccine Against Rotavirus Diarrhea in Infants During a Predominantly Serotype 1 Rotavirus Season," *The Journal of Infectious Diseases*, 158(3), 1988, 570–587.

Timo Vesikari et al., "Dose–response study of RIT 4237 oral rotavirus vaccine in breast–fed and formula–fed infants," *Pediatric Infectious Disease*, 4(6), 1985, 622–625.

W. McKim Marriott and L. T. Davidson, "Acidified Whole Milk as a Routine Infant Food," *Journal American Medical Association*, 81(24), 1923, 2007–2010.

Timo Vesikari, et al., "Increased 'Take' Rate of Oral Rotavirus Vaccine in Infants After Milk Feeding," *The Lancet*, 2, 1984, 700.

J. Gryboski and W. A. Walker, *Gastrointestinal Problems in the Infant*, 2nd Edition, W. B. Saunders and Co., Philadelphia, 1983, pp. 217–218.

*Primary Examiner*—Brian Burn
*Attorney, Agent, or Firm*—Thomas R. Savitsky

[57] ABSTRACT

A low buffer nutritional composition which is useful to reduce the incidence of colonization of pathogenic bacteria.

20 Claims, 6 Drawing Sheets

LOW BUFFER NUTRITIONAL COMPOSITION

FIELD OF THE INVENTION

The present invention concerns a liquid nutritional composition having low buffer strength.

BACKGROUND OF THE INVENTION

There are reports that indicate that breast fed infants experience fewer episodes of both gastrointestinal tract and respiratory tract infections than their bottle-fed counterparts (Jason et al., "Mortality and Infectious Disease Associated with Infant-Feeding Practices in Developing Countries," *Pediatrics*, 74(Suppl), 1984, 702–727; Kovar, et al, "Review of the Epidemiologic Evidence for an Association Between Infant Feeding and Infant Health," *Pediatrics*, 74(Suppl), 1984, 615–638). Accordingly, breast milk is considered to be the best food for newborn infants because of its nutritional value as well as its ability to provide protection against various infectious diseases. The greater protection associated with breast-feeding is believed to be due to the presence in human milk of a number of antimicrobial factors. Examples of anti-infective factors that are reportedly present in human milk but not conventional artificial formulas include lactoferrin, specific immunoglobulins, lysozyme, and lactoperoxidase. While the activity of anti-infective factors in human milk has been repeatedly demonstrated in vitro, the efficacy of individual factors has not been demonstrated in vivo.

Most intestinal pathogens are transmitted from human to human by the fecal-oral route. It is commonly believed that the acidic nature of gastric secretions provides a very effective host defense against intestinal pathogens by inactivating orally ingested pathogens before they reach the small or large intestine where they become established and cause disease. Indeed, numerous studies have described the germicidal role of gastric acid secretions in establishing a gastric barrier to infection (Drasar, et al., "Studies on the Intestinal Flora. I. The bacterial flora of the gastrointestinal tract in healthy and achlorhydric persons," *Gastroenterology*, 56, 1969, 71–79; Giannella, et al., "Influence of Gastric Acidity on Bacterial and Parasitic Enteric Infections," *Annals of Internal Medicine*, 78, 1973, 271–276).

For example, gastric contents from human subjects are virtually sterile when the pH is at a level of 4 or below. Secondly, studies with human volunteers have shown that the infective dose of *V. cholerae* is lowered from $10^8$ to $10^4$ bacteria by co-administration of sodium bicarbonate with the bacteria to neutralize gastric acid (Cash, et al., "Response of Man to Infection with *Vibrio cholerae*. I. Clinical, Serologic, and Bacteriologic Responses to a Known Inoculum," *The Journal of Infectious Diseases*, 129, 1974, 45–52). Such evidence collectively points to a major role for gastric acidity in the inactivation of orally ingested intestinal pathogens.

Studies with newborn infants, however, indicates minimal secretion of acid and pepsinogen in the stomach (Christie, D. L., "Development of Gastric Function During the First Month of Life," *Textbook of Gastroenterology and Nutrition in Infancy*, E. Lebenthal (ed), Raven Press, New York, 1981, pages 109–120; Deren, J. S., "Development of structure and function in the fetal and newborn stomach," *The American Journal of Clinical Nutrition*, 24, 1971, 144–159). Acid production rates on a body-weight basis are less than 50% of adult values for the first 3 months in infants. Adult production rates are not reached until 2 years of age (Agunod, et al., "Correlative Study of Hydrochloric Acid, Pepsin, and Intrinsic Factor in Newborns and Infants," *American Journal of Digestive Diseases*, 14, 1969, 400–414). This is in accordance with the observation that the pH of gastric contents is higher in infants (Gryboski, et al., *Gastrointestinal Problems in the Infant*, 2nd ed., W. B. Saunders and Co., Philadelphia, Pa., 1983, page 217; Usowicz, et al., "Does gastric acid protect the preterm infant from bacteria in unheated human milk?" *Early Human Development*, 16, 1988, 27–33) than in adults (Mayes, P. A., "Digestion/Absorption in the Gastrointestinal Tract," *Harper's Review of Biochemistry*, 19th ed., D. W. Martin, P. A. Mayes, and V. W. Rodwell (eds.), Lange Medical Publications, Los Altos, 1983, pages 546–558). Several studies have also shown that post-prandial gastric pH in bottle-fed infants is higher than the gastric pH in breast-fed infants. For example, Usowicz, et al. found that gastric pH in preterm infants tended to decrease with increasing age and was significantly lower in infants fed exclusively human milk (pH=2.7) when compared to formula-fed infants (pH=3.6). These investigators and others have found virtually sterile gastric contents when the pH was <3.5.

Human milk is known to have lower acid buffering properties than both cow milk and cow milk-based infant formulas (Bullen, et al., "The Effect of 'Humanised' Milks and Supplemented Breast Feeding on the Faecal Flora of Infants," *J. Med. Microbiol.*, 10(4), 1977, 403–413; Hentges, et al., "Influence of Infant Diets on the Ecology of the Intestinal Tract of Human Flora Associated mice," *Journal Pediatric Gastroenterology and Nutrition*, 14, 1992, 146–152).

It would be desirable to have an infant formula which more closely resembles human milk in its ability to allow the natural level of gastric acidity to be effective in inactivating orally ingested intestinal pathogens. It would also be desirable to provide such a product for maintaining the gastric barrier function in patients with compromised gastric acid secretory capacity such as the elderly or patients receiving treatments which reduce gastric acid output.

SUMMARY OF THE INVENTION

A liquid, nutritionally complete composition has been discovered which allows the natural level of gastric acidity to be more effective in inactivating orally ingested intestinal pathogens. The present invention is directed to a liquid, nutritionally complete composition, preferably an infant formula, having low buffer strength. As used herein, the term "buffer strength" means the volume of 0.1N HCl required to decrease the pH of a 50 milliliter (mL) volume of liquid composition from the starting pH to a pH of 3. As used herein, the term "low buffer strength" means a buffer strength of 18 or lower. A preferred buffer strength of the composition of the invention is about 9 to about 18, more preferred is about 11 to about 16, and most preferred is about 12 to about 15.

The present invention is also directed to a method for treating a subject in need of treatment by controlling orally ingested pathogenic organisms comprising administering to said subject an effective amount of the composition of the invention.

DETAILED DESCRIPTION OF THE INVENTION

The buffer strength of infant formulas ranges from 19 for certain milk-based formulas to above 40 for hydrolyzed milk formulas as shown in Table 1 below.

TABLE 1

BUFFER STRENGTH OF MARKETED FORMULAS

| Type | Brand | Form | Buffer Strength[a] |
|---|---|---|---|
| Milk based | Enfamil | RTU | 24.1 |
| | Enfamil | Powder | 22.2 |
| | Enfalac | RTU | 19.5 |
| | Enfalac | Powder | 20.0 |
| | Similac | RTU | 22.0 |
| | SMA | RTU | 22.0 |
| | SMA | Powder | 19.0 |
| | Good Start | RTU | 27.0 |

TABLE 1-continued

BUFFER STRENGTH OF MARKETED FORMULAS

| Type | Brand | Form | Buffer Strength[a] |
|---|---|---|---|
| | Carnation (Follow-on) | RTU | 29.0 |
| | Morinaga | Powder | 22.0 |
| | Lactofree | RTU | 19.5 |
| | Perlargon (Nestle) | Powder | 25.0 |
| Soy based | ProSobee | RTU | 29.0 |
| | ProSobee | Powder | 31.0 |
| | Isomil | Powder | 31.0 |
| | Gerber Soy | RTU | 28.0 |
| Hydrolysate | Enfastart | Powder | 29.0 |
| | Nutramigen | | 42.0 |
| | Alimentum | | 47.0 |

[a]Defined as volume of acid required to decrease starting pH at normal use concentration to pH = 3.

Figure 1:
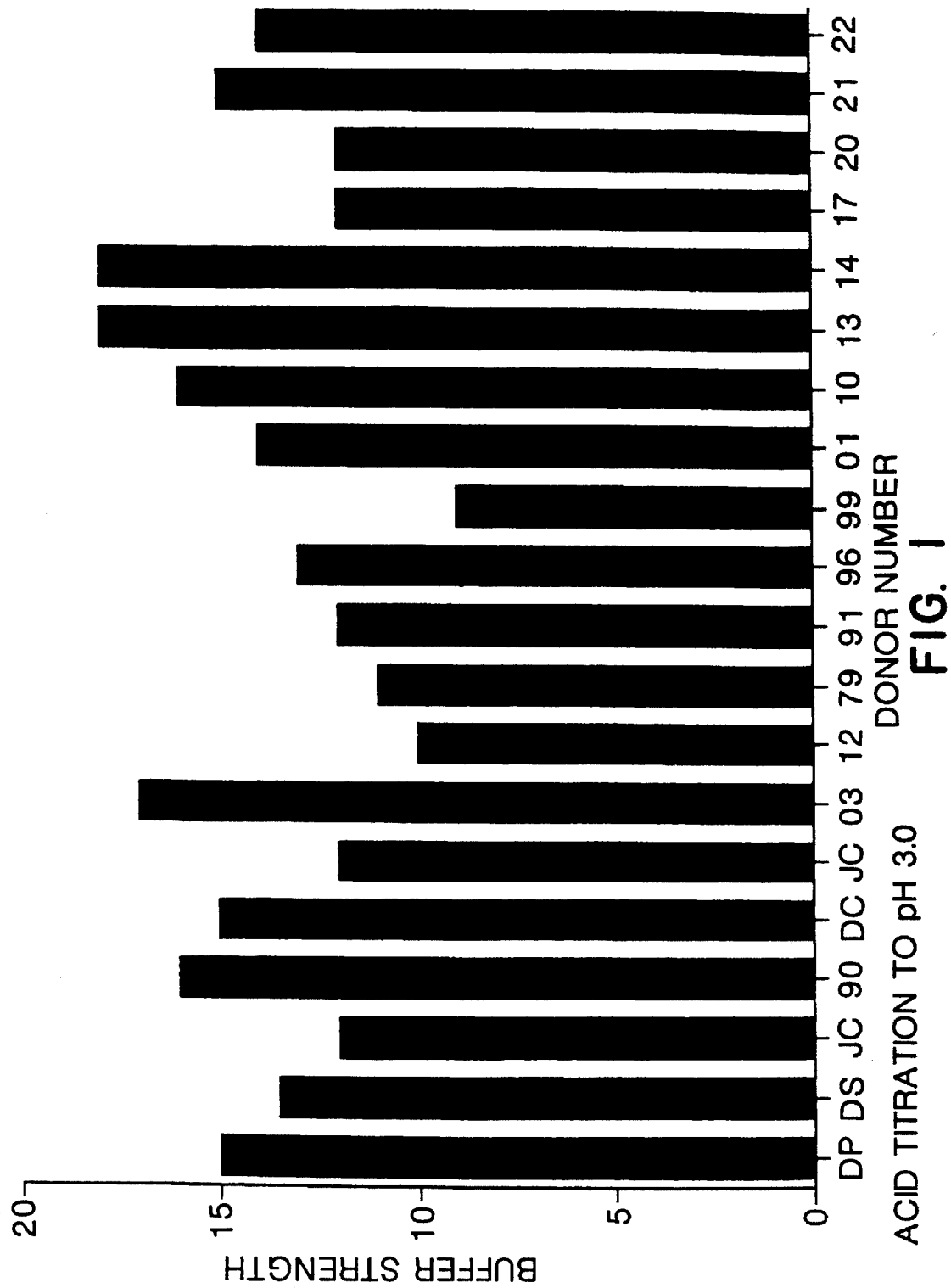
FIG. 1—Buffer strength of human milk samples from 19 mothers.

Furthermore, the buffer strength of nutritionally complete products for adults is generally greater than the buffer strength of products shown in Table 1, since the protein levels are typically higher. The buffer strength of human milk from individual donors is highly variable. Examination of human milk samples from 19 mothers showed that the buffer strength of human milk ranges from 9.0 to 18.0, with an average of 13.5 (FIG. 1). The buffer strength of preterm human milk ranges from 12.0 to 27.0, with an average of 18.6 as shown in Table 2.

TABLE 2

BUFFER CAPACITY OF PRETERM HUMAN MILK SAMPLES

| Product | Form | Buffer Strength |
|---|---|---|
| 1006 | Skim, prem | 18.0 |
| 1008 | Skim, prem | 17.0 |
| 10117 | Skim, prem | 18.0 |
| 1011a | Skim, prem | 18.0 |
| 1014 | Skim, prem | 17.0 |
| 101510 | Skim, prem | 18.0 |
| 10158 | Skim, prem | 16.0 |
| 1017 | Skim, prem | 20.0 |
| 101811 | Skim, prem | 20.0 |
| 10187 | Skim, prem | 27.0 |
| 1025 | Skim, prem | 14.0 |
| 2411 | Skim, prem | 21.0 |
| 2412 | Skim, prem | 19.0 |
| 2419 | Skim, prem | 12.0 |
| Baut | Skim, prem | 18.0 |
| Cruz | Skim, prem | 25.0 |
| ENOS | Skim, prem | 15.0 |
| Moha | Skim, prem | 20.0 |
| Soli | Skim, prem | 21.0 |
| | Average | 18.6 |

It is believed that such differences in buffer strength contribute to the lower fecal pH observed in human milk-fed infants compared to bottle-fed infants. The wide range in buffer capacity for individual human milk samples may also explain why results from some clinical studies have not shown a benefit for breast-feeding in providing protection against intestinal infections or diarrhea. The observation that the buffer strength of human milk samples from some donors can be as high as that found in infant formulas raises the possibility that the gastric pH may remain high in infants fed either formula or human milk samples showing high acid buffering capacity. These results indicate that formulas with acid buffering capability that is higher than average human milk further compromise the protective nature of the relatively immature gastric acid secretions in the newborn infant.

In a similar fashion consumption by adult subjects having an impaired gastric acid output of nutritionally complete nutritional compositions of high buffer strength also compromises the protective nature of their low gastric acid secretions.

We have discovered that the effectiveness of gastric acidity as a nonspecific line of defense against enteric disease is enhanced by use of the nutritionally complete composition of the invention having low buffer capacity.

Any suitable means known in the art to reduce buffer strength is contemplated to be applicable to arrive at the nutritionally complete composition of the invention having low buffer strength.

Variations of the ingredients in nutritionally complete compositions which contribute to the buffer strength of the composition is the preferred means of achieving the low buffer strength composition of the invention.

The buffer strength of a nutritionally complete product, such as infant formula or adult enteral composition, is expected to come from its protein and electrolyte constituents. The buffering capacity of protein derives from the dissociable functional groups on the side chains of polypeptide backbone. The dissociation coefficients of these functional groups vary according to their local environment such as accessibility to water solvent. Thus, the buffering capacity of each type of protein is unique. It depends on the number and type of dissociable groups on the polypeptide chain and the conformation of the molecule in water solvent.

The other expected contributors of buffering capacity are the multivalent electrolytes. In the make-up of the composition, different salts are used to supply essential minerals, to maintain functionality of the product, and, to control the pH throughout the product production/usage life circle. The salts that are expected to contribute to buffering capacity belong to the anion group families such as: phosphate, citrate, carbonate, acetate, and lactate. Lastly, the initial pH of the liquid composition contributes to the buffer strength of the composition when viewed in the context of the definition provided for composition buffer strength (i.e., volume of acid required to decrease starting pH to a pH of 3). By this line of reasoning, more acid would be required to decrease the pH of a composition to a pH of 3 for a composition with starting pH of 7.0 compared to a composition with starting pH of 6.0. Hence, the former product would have a higher buffer strength.

We have surprisingly discovered that varying the level of citrates is effective in modifying buffer strength of liquid, nutritionally complete composition, whereas varying the level of protein and phosphates within allowable ranges has no significant effect. Thus, it is preferred that the low buffer composition of the invention is prepared by varying the citrate level of the composition. The composition of the invention preferably contains less than 0.5% weight/weight (w/w) citrates on solids basis, more preferably less than 0.25% (w/w) citrates on solids basis, and most preferably less than 0.1% (w/w) citrates on solids basis.

The composition of the invention is nutritionally complete. By the term "nutritionally complete" is meant that the composition contains adequate nutrients to sustain healthy human life for extended periods. The composition can be cow milk-based, soy-based, or based on other nutrients. The caloric density of the nutritionally complete composition of the invention contains from 15 to 60 calories per fluid ounce in a ready-to-feed form. The liquid, nutritionally complete composition of the invention is an infant formula or an adult enteral composition that is intended to come into contact with the gastric contents of the stomach. Thus, the composition of the invention can be administered via the normal oral route or via tube feeding. The composition of the invention is preferably an infant formula.

The composition of the invention contains ingredients which are designed to meet the nutritional needs of mammals, especially humans, such as a protein (amino acid) source, a lipid source, and a carbohydrate source. Typically milk, skim milk, casein, hydrolyzed casein, hydrolyzed whey protein, whey, vegetable protein concentrate (e.g. soy protein isolate), hydrolyzed vegetable protein (e.g. soy), animal oils, vegetable oils, starch, sucrose, lactose and/or corn syrup solids will be added to the composition to supply part or all of the amino acids and/or protein, lipid, and carbohydrate as well as other nutrients such as vitamins and minerals.

The composition of the invention preferably comprises about 0.5 g to about 10.0 g protein, about 0.1 g to about 9.0 g lipid, and about 6.0 g to about 25.0 g total carbohydrate per 100 calories of composition. More preferably, the composition of the invention comprises about 1.0 g to about 8.0 g protein, about 0.2 g to about 8.0 g lipid, and about 7 g to about 22.9 g carbohydrate per 100 calories of composition. Most preferably, the composition of the invention comprises about 1.8 g to about 6.2 g protein, about 0.4 g to about 7.0 g lipid, and about 8.0 g to about 20.0 g carbohydrate per 100 calories of composition.

The carbohydrate component of the composition of the invention can be any suitable carbohydrate known in the art to be suitable for use in nutritionally complete compositions. Typical carbohydrates include sucrose, fructose, xylitol, glucose, maltodextrin, lactose, corn syrup, corn syrup solids, rice syrup solids, rice starch, modified corn starch, modified tapioca starch, rice flour, soy flour, and the like. Part of the carbohydrate can be fiber such as soy fiber, pectin, oat fiber, pea fiber, guar gum, gum acacia, modified cellulose, and the like.

The lipid can be any lipid or fat known in the art to be suitable for use in nutritionally complete compositions. Typical lipid sources include milk fat, safflower oil, canola oil, egg yolk lipid, olive oil, cotton seed oil, coconut oil, palm oil, palm kernel oil, soybean oil, sunflower oil, fish oil and fractions of all above oils derived thereof such as palm olein, medium chain triglycerides (MCT), and esters of fatty acids wherein the fatty acids are, for example, arachidonic acid, linoleic acid, palmitic acid, stearic acid, docosahexaenoic acid, eicosapentaenoic acid, linolenic acid, oleic acid, lauric acid, capric acid, caprylic acid, caproic acid, and the like. High oleic forms of various oils are also contemplated to be useful herein such as high oleic sunflower oil and high oleic safflower oil.

The protein can be any protein and/or amino acid mixture known in the art to be suitable for use in nutritionally complete compositions. Typical protein sources are animal protein, vegetable protein such as soy protein, milk protein such as skim milk protein, whey protein and casein, and amino acids (or salts thereof) such as isoleucine, phenylalanine, leucine, lysine, methionine, threonine, tryptophan, arginine, glutamine, taurine, valine, and the like. Preferred protein sources are whey protein, sodium caseinate or calcium caseinate optionally supplemented with amino acids. For some applications a preferred protein source is hydrolyzed protein (protein hydrolysate) optionally supplemented with amino acids.

The protein hydrolysate useful in the invention may be any suitable protein hydrolysate utilized in a nutritional formula such as soy protein hydrolysate, casein hydrolysate, whey protein hydrolysate, other animal and vegetable protein hydrolysates, and mixtures thereof. The protein hydrolysate of the composition of the invention is preferably a soy protein, whey protein, or a casein hydrolysate comprising short peptides and amino acids, optionally supplemented with additional amino acids. In a preferred embodiment, the protein hydrolysate useful in the invention contains a high percentage of free amino acids (e.g. greater than 40%) and low molecular weight peptide fragments.

The hydrolyzed protein of the composition of the invention is also preferably supplemented with various free amino acids to provide a nutritionally balanced amino content. Examples of such free amino acids include L-tryptophan, L-methionine, L-cystine, L-tyrosine, and L-arginine.

Nutritionally complete compositions contain all vitamins and minerals understood to be essential in the daily diet and these should be present in nutritionally significant amounts. Those skilled in the art appreciate that minimum requirements have been established for certain vitamins and minerals that are known to be necessary for normal physiological function. Practitioners also understand that appropriate additional amounts (overages) of vitamin and mineral ingredients need to be provided to compensate for some loss during processing and storage of such compositions. The composition of the invention preferably contains at least 100% of the U.S. Recommended Daily Allowance (RDA) in 500 to 4000 cal of composition, preferably in 600 to 3000 cal of composition.

To select a specific vitamin or mineral compound to be used in the composition requires consideration of that compound's chemical nature regarding compatibility with the processing and shelf storage.

Examples of minerals, vitamins and other nutrients optionally present in the infant formula of the invention include vitamin A, vitamin $B_6$, vitamin $B_{12}$, vitamin E, vitamin K, vitamin C, vitamin D, inositol, taurine, folic acid, thiamine, riboflavin, niacin, biotin, pantothenic acid, choline, calcium, phosphorous, iodine, iron, magnesium, copper, zinc, manganese, chloride, potassium, sodium, beta-carotene, nucleotides, selenium, chromium, molybdenum, and L-carnitine. Minerals are usually added in salt form. In addition to compatibility and stability considerations, the presence and amounts of specific minerals and other vitamins will vary somewhat depending on the intended consumer population.

The composition of the invention also typically contains emulsifiers and/or stabilizers such as lecithin, (e.g., egg or soy), carrageenan, xanthan gum, mono- and diglycerides, guar gum, carboxymethyl cellulose, stearoyl lactylates, succinylated monoglycerides, diacetyl tartaric acid esters of monoglycerides, polyglycerol esters of fatty acids, or any mixture thereof.

The composition of the invention can be prepared by use of standard techniques known in the nutritional art, for example by techniques analogous to those disclosed in U.S. Pat. Nos. 4,670,268; 4,497,800; 4,921,877; 5,104,677; and 5,223,285, the disclosures of which are incorporated herein by reference in their entirety.

The composition of the invention can be sterilized, if desired, by technique known in the art, for example, heat treatment such as autoclaving or retorting, irradiation, and the like, or processed and packaged by aseptic technology.

The composition of the invention can be packaged in any type of container known in the art to be useful for storing nutritional products such as glass, lined paperboard, plastic, coated metal cans and the like.

In the method of the invention for controlling orally ingested pathogens, the effective amount of composition is sufficient to prevent colonization of a pathogenic microorganism in the intestinal tract (a prophylactically effective amount) or is sufficient to cure or alleviate a disease state caused by the pathogenic microorganism (a therapeutically effective amount). Thus, the term "controlling" refers to antimicrobial activity such as the suppression, inhibition, kill, stasis, inactivation or destruction of pathogenic microorganism, or any interference with the growth of pathogenic microorganisms which results in a slower growth rate. The effective amount of composition of the invention (either therapeutically effective or prophylactically effective) is achieved when the subject obtains all or substantially all (i.e., greater than 50%, preferably greater than 75%) of its nutritional requirements by ingestion (either oral or tube feeding) of the composition of the invention. The pathogenic microorganisms contemplated herein are those microorganisms which are pathogenic via the oral route. Examples of such microorganisms include bacteria such as *Vibrio sp., Salmonella sp., Shigella sp., Shigella sp., Campylobacter sp., Clostridia sp., Aeromonas sp., Staphylococcus sp., Pseudomonas sp.,* and the like, parasites such as *Giardia sp., Cryptosporidium sp.,* and the like, and viruses, such as rotavirus, and the like.

The subjects contemplated in the method of the invention are preferably humans and are those subjects having low gastric secretions such as infants (i.e., up to 12 months of age) or adults with an impaired gastric acid output. Such adults are elderly adults, or adults having illnesses or conditions resulting in low gastric acid output and/or are adults receiving treatments which lower gastric acid output. The subjects are preferably infants.

The following examples are to illustrate the invention but should not be interpreted as a limitation thereon.

EXAMPLE 1

Acid Sensitivity of Enteric Pathogens

It has been estimated that rotaviruses (RV) are responsible for 25–40% of the cases of infantile gastroenteritis of infectious origin. The remaining cases are caused by a variety of bacterial (e.g., Salmonella, *E. coli,* Shigella, Campylobacter, Clostridia, Aeromonas, etc.) and parasitic (e.g., Giardia, Cryptosporidia, etc.) agents. The potential use of many human milk factors with antibacterial activity (e.g. lactoferrin (LF), lactoperoxidase (LP), and lysozyme) in an infant formula is complicated by special needs or problems. This includes possible inactivation by gastric secretions, the presence of counteractive ingredients (e.g., Fe and citrate vs LF), or a requirement for needed cofactors (e.g., $H_2O_2$ for LP). Inactivation of RV during transit through the acid environment of the infant stomach would be an extremely desirable defense mechanism since RV is a major cause of acute gastroenteritis in children under age 2. Published data on gastric inactivation of RV are limited to acid inactivation of bovine and simian RV strains (Giannella, et al., "Influence of Gastric Acidity on Bacterial and Parasitic Enteric Infections," *Annals of Internal Medicine,* 78, 1973, 271–276; Cash, et al., "Response of Man to Infection with *Vibrio cholera.* I. Clinical, Serologic, and Bacteriologic Responses to a Known Inoculum," *The Journal of Infectious Diseases,* 129, 1974, 45–52). These studies were primarily concerned with the effect of gastric acid on the efficacy of RV vaccines in inducing protective antibodies.

Several in vivo and in vitro studies have examined the ability of enteric pathogens to survive exposure to gastric acid (Giannella, et al., "Influence of Gastric Acidity on Bacterial and Parasitic Enteric Infections," *Annals of Internal Medicine*, 78, 1973, 271–276; Cash, et al., "Response of Man to Infection with *Vibrio cholera*. I. Clinical, Serologic, and Bacteriologic Responses to a Known Inoculum," *The Journal of Infectious Diseases*, 129, 1974, 45–52; Weiss, et al., "Rapid Inactivation of Rotaviruses by Exposure to Acid Buffer or Acidic Gastric Juice," *J. Gen. Virol.*, 66, 1985, 2725–2730; Gorden, et al., "Acid Resistance in Enteric Bacteria," *Infection and Immunity*, 61, 1993, 364–367). Acid sensitivity in in vitro studies is commonly defined as the survival of a standard concentration of bacteria following exposure to pH 2.0–2.5 for 2 hours. An alternative in vitro model was developed to evaluate acid sensitivity of various enteric pathogens under conditions that more closely simulate the potential exposure to acidic environments in the stomach of the infant. More specifically, this method consisted of adding test bacteria at about $2\times10^6$ colony forming units (CFU) per mL to heart infusion broth (HIB) that was pre-adjusted to pH 4, 3, or 2. Cell suspensions were incubated for 15 minutes at 37° C. to simulate exposure to acid secretions during gastric transit. Immediately following the incubation period, all test samples were immediately diluted 1:10 in phosphate buffered saline (PBS, pH=7.2) to neutralize the pH of the incubation media. The number of viable bacteria remaining in test samples was determined by standard plate counting procedures on suitable growth media. The acid sensitivity of various strains of rotavirus was evaluated by a similar method. Virus was added at a level of approximately $5\times10^5$ plaque forming units (PFU) per mL of glycine buffer at pH 2, 3, or 4. Virus suspensions were incubated for 30 minutes at 37° C. and then examined for number of infectious virus using a standard viral plaque assay method on fetal African green monkey kidney cells (MA-104). Control samples consisted of virus incubated in tissue culture medium without fetal calf serum at pH 7. Control samples for each experiment consisted of incubating the test bacterial strain at pH=7. Acid sensitivity was defined in terms of the pH which resulted in greater than a 10-fold reduction in number of viable cells.

The acid sensitivity for a variety of intestinal pathogenic bacteria and viruses is shown in Table 3.

TABLE 3

ACID SENSITIVITY OF ENTERIC PATHOGENS

| Pathogen | Code | BACTERIAL SURVIVAL (LOG CFU/mL) following 15 min incubation at pH: | | | | |
|---|---|---|---|---|---|---|
| | | pH = 7 | pH = 5 | pH = 4 | pH = 3 | pH = 2 |
| Group B Streptococcus | M94 | 4.95 | | 5.25 | <3.0 | <2.0 |
| *Salmonella typhi* | ST-1 | 6.14 | | 6.08 | 4.77 | <2.0 |
| *Salmonella typhi* | ST651 | 5.99 | | 6.02 | 5.87 | <2.0 |
| *S. typhimurium* | ST-SR2 | 6.33 | | 6.35 | 5.29 | <2.0 |
| *S. typhimurium* | STY3-SR2 | 6.11 | 6.08 | 5.85 | 5.79 | <2.0 |
| *Shigella flexneri* | SF-661 | 6.36 | | 6.31 | 6.18 | 5.17 |
| *Shigella sonnei* | SS-3SR | 6.00 | 6.05 | 5.81 | 5.72 | 5.53 |
| ETEC | ETEC-2SR | 6.02 | 6.06 | 5.77 | 5.71 | 5.63 |
| *E. coli* (K-12) | E-22 | 6.24 | | 6.21 | 6.08 | 5.53 |
| *V. cholerae* | V-2 | 6.60 | | <3.0 | <2.0 | <2.0 |
| *V. cholerae* | V-1 | 6.34 | | <3.0 | <2.0 | <2.0 |
| Rotavirus | HRV1/WA | 5.88 | | 5.23 | <1.0 | <1.0 |
| Rotavirus | HRV3/p | 5.86 | | 5.20 | <1.0 | <1.0 |
| Rotavirus | SRVSA11 | 5.75 | | 5.28 | <1.0 | <1.0 |

Note:
Rotavirus strains tested following 30 minute incubation at indicated pH.

A high degree of variability in acid sensitivity was observed for different test pathogens. For example, strains of *Vibrio cholerae* were inactivated at a pH of 4 or below, while pathogenic strains of *Escherichia coli* and Shigella survived incubation down to pH 2. Rotavirus, Group B Streptococcus, *V. cholerae* and certain strains of Salmonella showed at least a 10-fold reduction in viability at pH 3 or below. These results indicate that the buffer strength of human milk or formula over the pH range of 7 to 3 is physiologically relevant in terms of acidification of gastric contents to provide gastric barrier function.

EXAMPLE 2

Development of Reduced Buffer Strength Formula

In order to design formula with buffering strength substantially lower than the currently marketed product and approaching that of the human milk, the effects of protein and the two commonly used family of salts, phosphates and citrates, on buffer strength were evaluated in a two-level factorial design experiment. The protein sources of experimental products were sodium caseinate (92% protein) and high purity whey protein isolate (95% protein). The ratio of casein to whey protein was 40:60. The protein levels designated in experimental design were 1.3 and 1.5% w/v. The formulation of salts were adjusted to two levels of citrates: 0.1 and 1.2 g/L and two levels of phosphorus: 0.14 and 0.25 g/L. Citrate salts are commonly used to control pH fluctuation in processing, therefore, wider ranges were chosen for experimentation. The ingredients were dissolved in water at 50° C. and homogenized at 3,000 psi. The products were freeze-dried and reconstituted to designated protein levels for buffer strength determination. The citrate and phosphorus contents were measured by spectrophotometric methods.

The experimental design and the buffer strength of eight formula samples are listed in Table 4.

TABLE 4

**BUFFER STRENGTH* OF MILK PROTEIN BASED FORMULAS**

| Sample | Protein (%) | Code | Citrate (g/L) | Code | Phosphorus (g/L) | Code | Buffer Strength |
|---|---|---|---|---|---|---|---|
| 1 | 1.3 | 0 | 0.055 | 0 | 0.140 | 0 | 13.0 |
| 2 | 1.5 | 1 | 0.075 | 0 | 0.142 | 0 | 14.0 |
| 3 | 1.3 | 0 | 1.260 | 1 | 0.149 | 0 | 20.5 |
| 4 | 1.5 | 1 | 1.205 | 1 | 0.159 | 0 | 21.0 |
| 5 | 1.3 | 0 | 0.000 | 0 | 0.189 | 1 | 13.0 |
| 6 | 1.5 | 1 | 0.098 | 0 | 0.252 | 1 | 15.0 |
| 7 | 1.3 | 0 | 1.206 | 1 | 0.257 | 1 | 20.5 |
| 8 | 1.5 | 1 | 1.309 | 1 | 0.310 | 1 | 21.5 |

*Milliliter of 0.1 N HCl needed to lower the pH of 50 ml sample to 3.0.

The experimental variables are coded for statistical analysis. The effects of experimental variables were analyzed by analysis of variance (ANOVA) procedures. Results of statistical analysis are listed in Table 5.

TABLE 5

STATISTICAL ANALYSIS OF THE EFFECT OF PROTEIN, CITRATE, AND PHOSPHORUS LEVELS ON BUFFER STRENGTH

| Code | Mean | Std. error | N | ANOVA Table Source | SS | DF | MS | F-ratio | P |
|---|---|---|---|---|---|---|---|---|---|
| | | | | Variable factor: Protein | | | | | |
| 0 | 16.75 | 2.066 | 4 | Protein | 2.531 | 1 | 2.531 | 0.148 | 0.713 |
| 1 | 17.88 | 2.066 | 4 | Error | 102.438 | 6 | 17.073 | | |
| | | | | Variable factor: Citrate | | | | | |
| 0 | 13.75 | 0.378 | 4 | Citrate | 101.531 | 1 | 101.531 | 177.22 | <0.0001 |
| 1 | 20.88 | 0.378 | 4 | Error | 3.438 | 6 | 0.573 | | |
| | | | | Variable factor: Phosphorus | | | | | |
| 0 | 17.13 | 2.089 | 4 | Phosphorus | 0.281 | 1 | 0.281 | 0.016 | 0.903 |
| 1 | 17.5 | 2.089 | 4 | Error | 104.688 | 6 | 17.448 | | |

There is no significant difference between the buffer strength of formulas made with either high or low levels of protein or phosphorus. However, the buffer strength of formulas made with the two levels of citrate differed very significantly ($P<0.0001$). The buffer strength of essentially citrate free ($<0.1$ g/L) formula is as low as that of average human milk.

Figure 2:
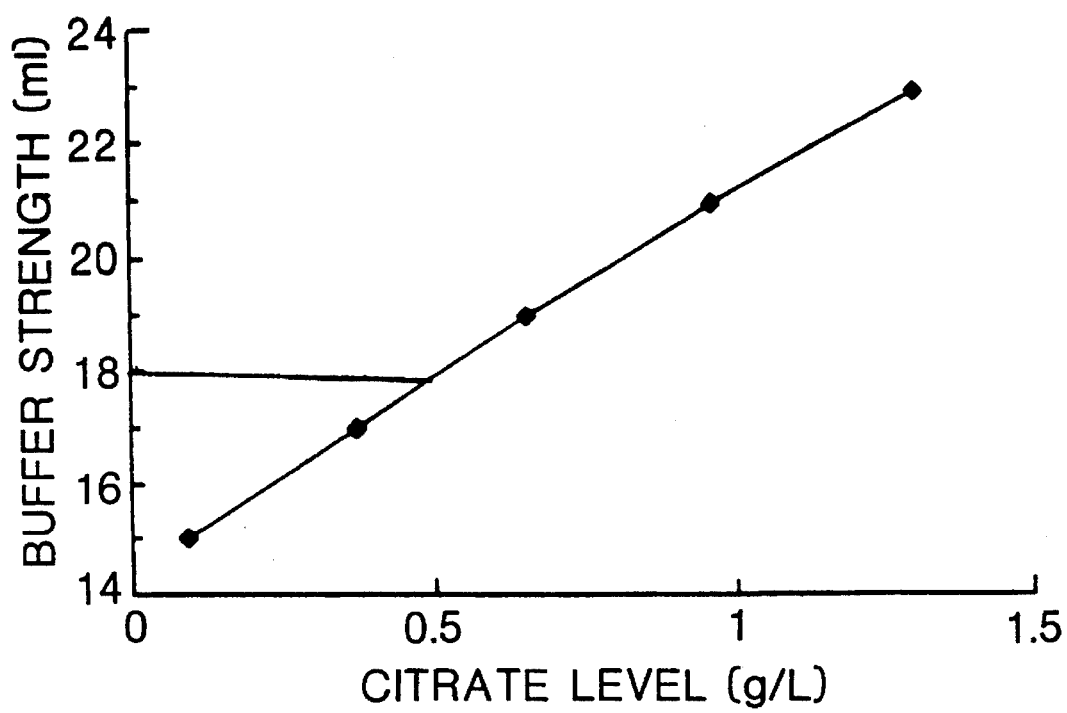
FIG. 2—Buffer strength in milliliters of acid vs. citrate level in formula in grams per liter (g/l).

To further demonstrate the effect of citrate on buffer strength, a basic formula was prepared (Table 6, example A) and potassium citrate added to reach citrate levels that ranged from 0.1 to 1.3 g/L. The resulting buffer strengths are listed in Table 7. The correlation between buffer strength and citrate level is linear as shown in FIG. 2.

TABLE 6

LOW BUFFER STRENGTH FORMULA EXAMPLE FORMULATIONS

| Ingredient | g/L |
|---|---|
| Example A | |
| Sodium caseinate (92%) | 6.64 |
| Whey protein isolate (95%) | 9.50 |
| Lactose | 68.25 |
| Vegetable oil | 36.42 |
| Calcium phosphate, dibasic | 1.37 |
| Calcium chloride | 0.64 |
| Potassium chloride | 1.04 |
| Mono and di-glyceride | 1.00 |
| Lecithin | 0.50 |
| Carrageenan | 0.30 |
| vitamin mixtures | 0.28 |
| Trace Minerals | 0.02 |
| Example B | |
| Total milk protein (90%) | 16.48 |
| Lactose | 68.25 |
| Vegetable oil | 36.42 |
| Calcium phosphate, tribasic | 0.72 |
| Calcium chloride | 0.25 |
| Potassium chloride | 1.04 |
| Mono and di-glyceride | 1.00 |
| Lecithin | 0.50 |
| Carrageenan | 0.30 |
| Vitamin mixtures | 0.28 |
| Trace minerals | 0.02 |
| Example C | |
| Soy protein isolate (93%) | 16.10 |
| Corn syrup solids | 68.25 |
| Vegetable oil | 34.00 |
| Calcium phosphate, tribasic | 0.94 |
| Magnesium chloride | 0.50 |
| Potassium chloride | 0.14 |
| Sodium chloride | 0.42 |
| Mono and di-glyceride | 0.50 |
| Lecithin | 0.50 |
| Carrageenan | 0.10 |
| Vitamin mixtures | 0.48 |
| Trace minerals | 0.03 |

TABLE 7

EFFECT OF CITRATE LEVEL ON BUFFER STRENGTH

| Citrate (g/L) | Buffer Strength (ml) |
| --- | --- |
| 0.09 | 15.00 |
| 0.37 | 17.00 |
| 0.65 | 19.00 |
| 0.96 | 21.00 |
| 1.30 | 23.00 |

Low buffer strength formula can be produced with different protein sources. In Table 6, three examples of reduced buffer strength formulations are presented. Example A is made with casein and whey protein isolates with 40:60 casein to whey protein ratio. Example B is made with total milk protein isolate (90% protein) which has casein:whey protein ratio of 80:20. Example C is made with soy protein isolate (93% protein). The buffer strength of examples A, B, and C are 14, 17, and 17, respectively. The citrate levels of all of these examples are less than 0.1 g/L.

EXAMPLE 3

Additional low buffer formulas were prepared as listed in Table 8.

TABLE 8

LOW BUFFER STRENGTH FORMULA EXAMPLE FORMULATIONS
(For all four examples, water was added q.s. to 1030.457 kg)

| Ingredient | Kg/1000 L |
| --- | --- |
| Example I | |
| Corn Syrup Solids | 73.788 |
| Total Milk Protein | 16.522 |
| Fat Blend | 36.065 |
| Monoglycerides | 0.557 |
| Lecithin | 0.557 |
| Carageenan | 0.300 |
| Choline Chloride | 0.140 |
| L-Carnitine | 0.014 |
| Calcium Phosphate, dibasic | 0.761 |
| Potassium Chloride | 0.613 |
| Magnesium Phosphate, dibasic | 0.294 |
| Sodium Chloride | 0.155 |
| Ferrous Sulfate, heptahydrate | 0.060 |
| Dry Vitamin Premix | 0.315 |
| Trace Mineral Premix | 0.286 |
| Vitamin ADEK Premix | 0.021 |
| $K_2CO_3$ | 0.542 |
| $Ca(OH)_2$ | 0.226 |
| Example II | |
| Corn Syrup Solids | 73.788 |
| Total Milk Protein | 16.522 |
| Fat Blend | 36.065 |
| Monoglycerides | 0.557 |
| Lecithin | 0.557 |
| Carageenan | 0.300 |
| Choline Chloride | 0.140 |
| L-Carnitine | 0.014 |
| Calcium Phosphate, dibasic | 0.761 |
| Potassium Chloride | 0.613 |
| Magnesium Phosphate, dibasic | 0.294 |
| Sodium Chloride | 0.155 |
| Ferrous Sulfate, heptahydrate | 0.060 |
| Dry Vitamin Premix | 0.315 |
| Trace Mineral Premix | 0.286 |
| Vitamin ADEK Premix | 0.021 |
| KOH | 0.512 |
| $CaCO_3$ | 0.309 |
| Example III | |
| Corn Syrup Solids | 73.788 |
| Total Milk Protein | 16.522 |
| Fat Blend | 36.065 |
| Monoglycerides | 0.557 |
| Lecithin | 0.557 |
| Carageenan | 0.300 |
| Choline Chloride | 0.140 |
| L-Carnitine | 0.014 |
| Calcium Phosphate, dibasic | 0.761 |
| Potassium Chloride | 0.613 |
| Magnesium Phosphate, dibasic | 0.294 |
| Sodium Chloride | 0.155 |
| Ferrous Sulfate, heptahydrate | 0.060 |
| Dry Vitamin Premix | 0.315 |
| Trace Mineral Premix | 0.286 |
| Vitamin ADEK Premix | 0.021 |
| $K_2CO_3$ | 0.542 |
| $CaCO_3$ | 0.309 |
| Example IV | |
| Corn Syrup Solids | 73.788 |
| Total Milk Protein | 16.522 |
| Fat Blend | 36.065 |
| Monoglycerides | 0.557 |
| Lecithin | 0.557 |
| Carageenan | 0.300 |
| Choline Chloride | 0.140 |
| L-Carnitine | 0.014 |
| Calcium Phosphate, dibasic | 0.761 |
| Potassium Chloride | 0.613 |
| Magnesium Phosphate, dibasic | 0.294 |
| Sodium Chloride | 0.155 |
| Ferrous Sulfate, heptahydrate | 0.060 |
| Dry Vitamin Premix | 0.315 |
| Trace Mineral Premix | 0.286 |
| Vitamin ADEK Premix | 0.021 |
| $Ca(OH)_2$ | 0.226 |
| KOH | 0.512 |

EXAMPLE 4

Enhanced Killing of GI Pathogens in vitro by Reduced Buffer Formula

An in vitro model was developed to evaluate the anti-infective benefit of reducing the buffer strength of infant formula. The model was designed to test (a) change in pH and (b) enhanced killing of a standard bacterial inoculum following incubation of known levels of test bacteria with physiologically relevant levels of test diet and gastric acid. Test diets consisted of a marketed cow milk-based infant formula (Enfamil), a low citrate/low phosphate formula (LBF 429), a low citrate/low pH formula (LBF 318, pH=6), and human milk. The human milk consisted of a pool from 7 individual donors. Varying amounts of 1.0N HCl (ranging from 0.5 to 3.5 mL) were added to either 60 or 120 mL of test diet. Proportions of diet and gastric acid were based on typical infant meal size (2–4 ounces) and estimated values for post-prandial gastric acid output in infants (Agunod, et al., "Correlative Study of Hydrochloric Acid, Pepsin, and Intrinsic Factor Secretion in Newborns and Infants," *American Journal of Digestive Diseases*, 14, 1969, 400–414), respectively. After measuring the pH of test diets with added amounts of gastric acid, test bacteria were added at approximately 1×10⁶ CFU/mL to evaluate germicidal properties. Samples were mixed, incubated at 37° C. for 15 minutes, and immediately diluted into phosphate buffered saline (pH 7) to neutralize acidity of acid-adjusted diets. The number of viable bacteria that remained in test diets was quantitated by standard plate counting methods on suitable media. Test bacteria included streptomycin-resistant variants of *Vibrio cholerae* (strain VC2-SR2) and *Salmonella typhimurium* (strain ST1-SR2). Streptomycin-resistant variants were used in these studies to allow quantitation of test bacteria without interference by contaminating bacteria in non-sterile, powder forms of test formulas.

Figure 3:
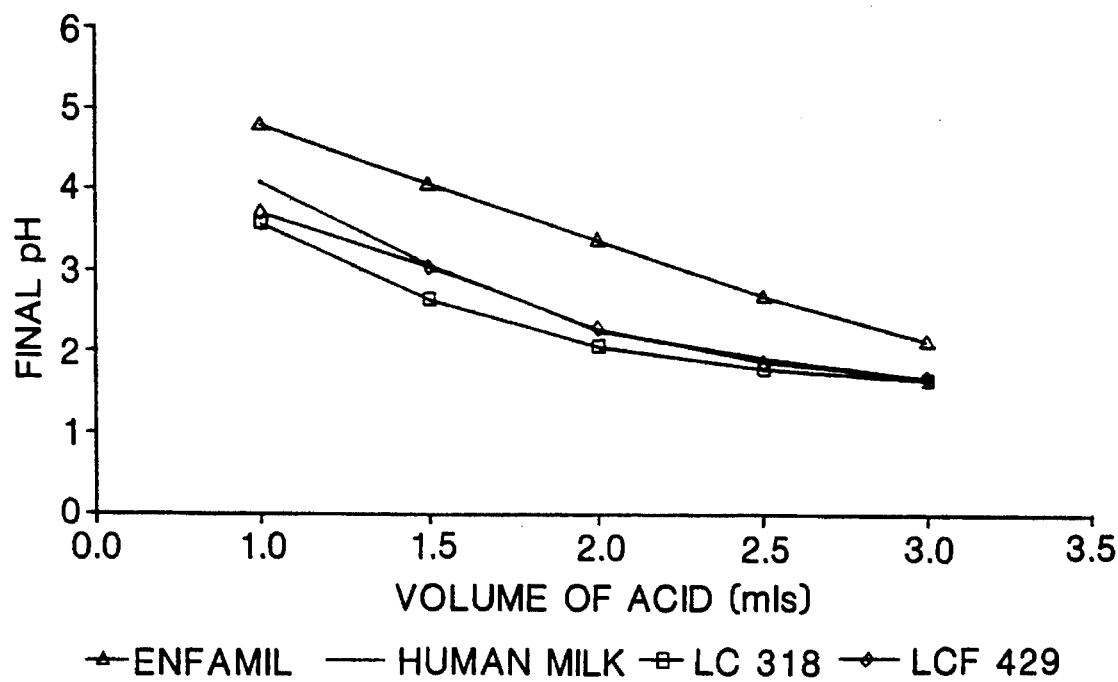
FIG. 3—The change in pH following addition of acid to tests diets (60 mL meal) as described in Example 4. "△" is Enfamil® infant formula, available from Mead Johnson & Company, Evansville, IN, U.S.A.; "—" is human milk; "⊟" is LC318 and "◇" is LCF429.
Figure 4:
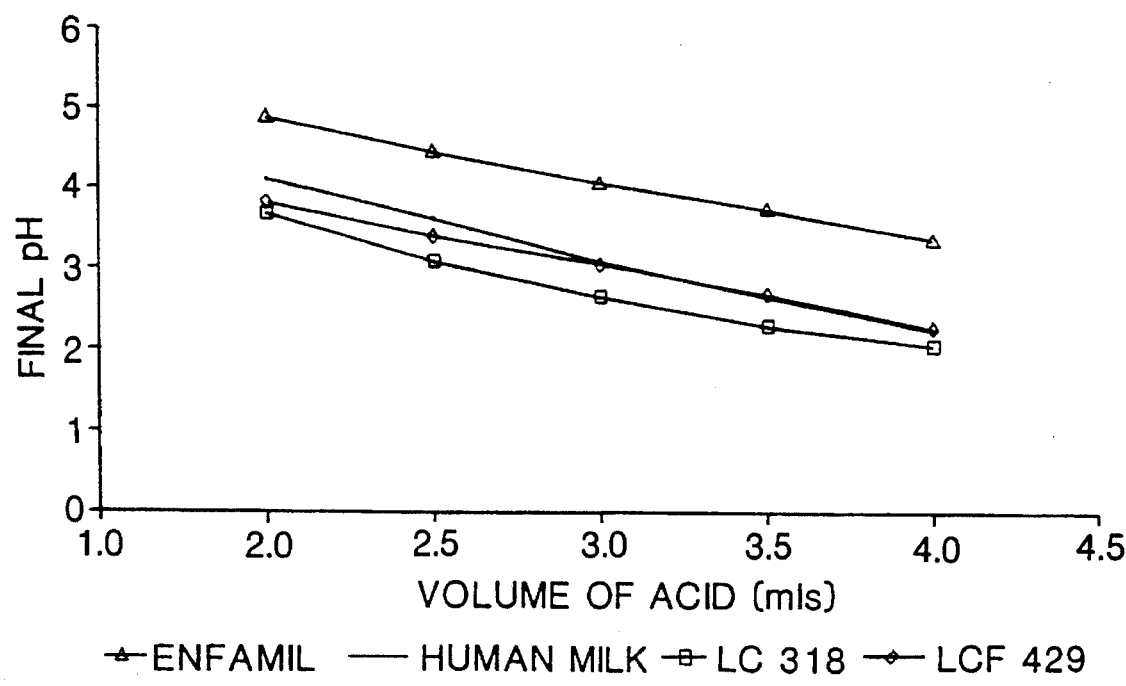
FIG. 4—The change in pH following addition of acid to tests diets (120 mL meal) as described in Example 4. "△" is Enfamil® infant formula, available from Mead Johnson & Company, Evansville, IN, U.S.A.; "—" is human milk; "⊟" is LC318 and "◇" is LCF429.
Figure 5:
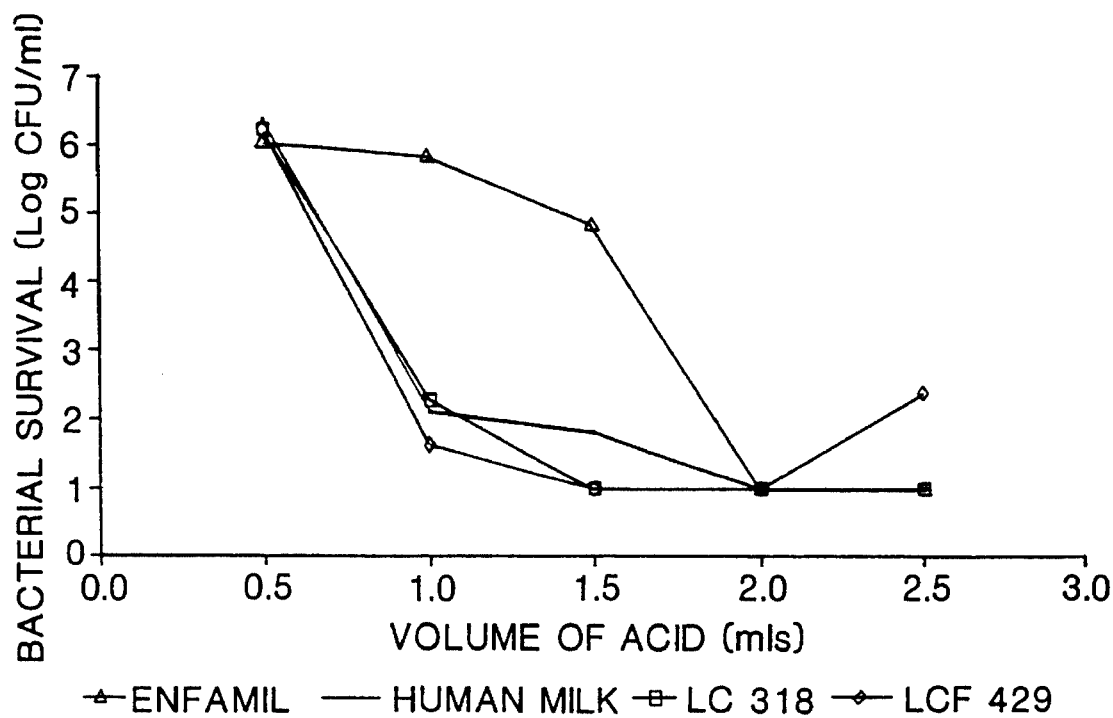
FIG. 5—Bacterial survival of *Vibrio cholerae* after 15 minutes in various formulas as a function of added acid to various infant formulas as described in Example 4. "△" is Enfamil® infant formula, available from Mead Johnson & Company, Evansville, IN, U.S.A.; "—" is human milk; "⊟" is LC318 and "◇" is LCF429. The volume of the meal was 60 mL.
Figure 6:
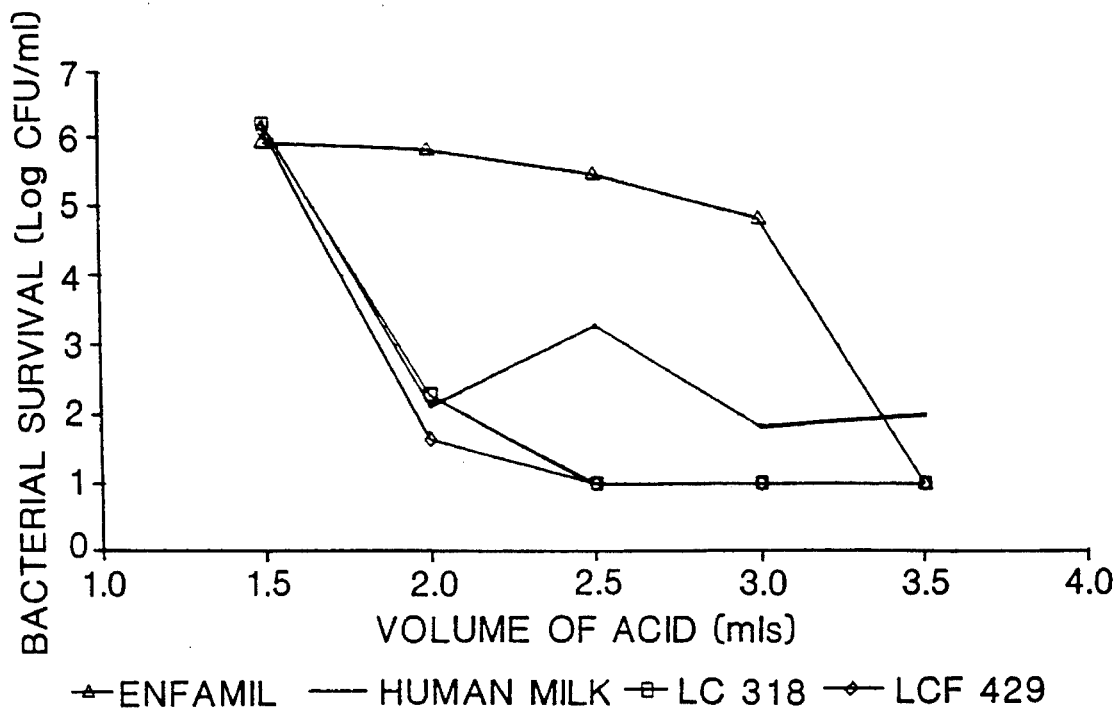
FIG. 6—Bacterial survival of *Vibrio cholerae* after 15 minutes in various formulas as a function of added acid to various infant formulas as described in Example 4. "△" is Enfamil® infant formula, available from Mead Johnson & Company, Evansville, IN, U.S.A.; "—" is human milk; "⊟" is LC318 and "◇" is LCF429. The volume of the meal was 120 mL.
Figure 7:
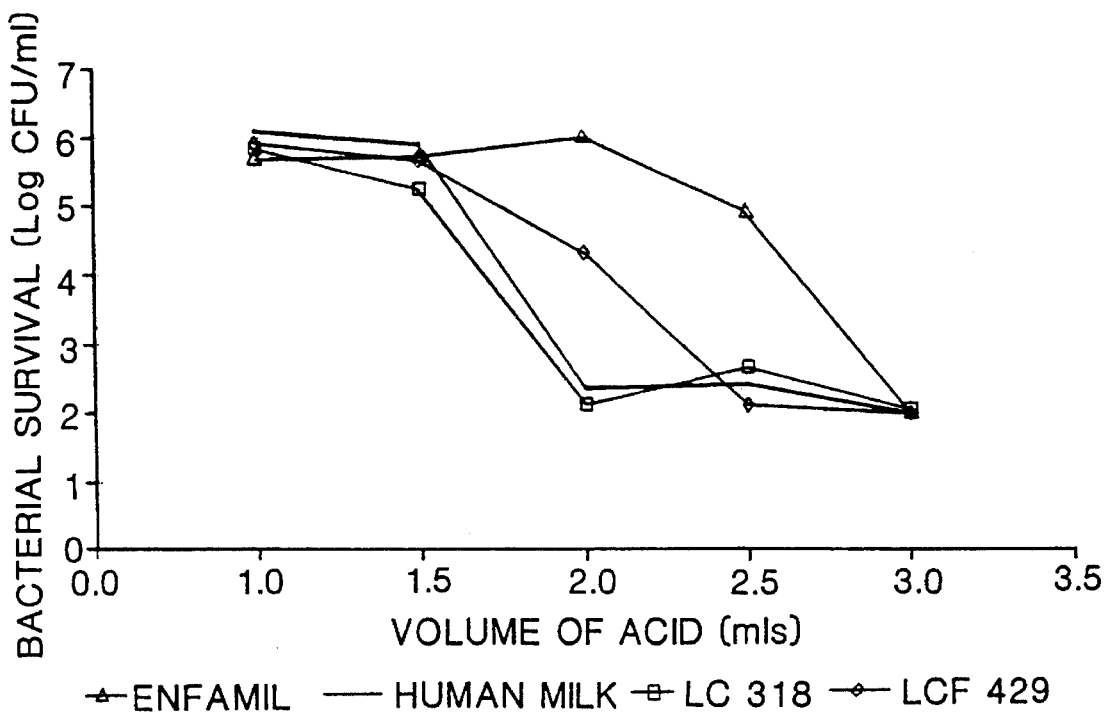
FIG. 7—Bacterial survival of *Salmonella typhimurium* after 15 minutes in various formulas as a function of added acid to various infant formulas as described in Example 4. "△" is Enfamil® infant formula, available from Mead Johnson & Company, Evansville, IN, U.S.A.; "—" is human milk; "⊟" is LC318 and "◇" is LCF429. The volume of the meal was 60 mL.
Figure 8:
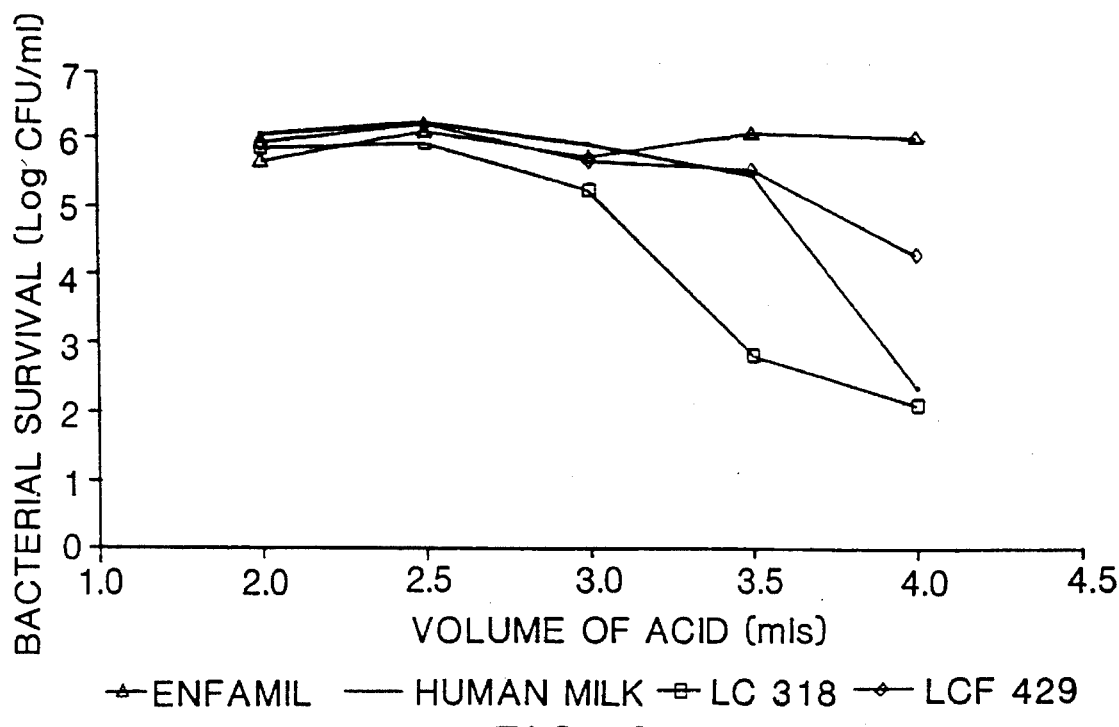
FIG. 8—Bacterial survival of *Salmonella typhimurium* after 15 minutes in various formulas as a function of added acid to various infant formulas as described in Example 4. "△" is Enfamil® infant formula, available from Mead Johnson & Company, Evansville, IN, U.S.A.; "—" is human milk; "⊟" is LC318 and "◇" is LCF429. The volume of the meal was 120 mL.

The change in pH following addition of acid to test diets (60 and 120 mL volumes) is shown in FIGS. 3 and 4. The overall pattern for the decrease in pH of reduced buffer formulas was similar to that observed with human milk and considerably lower than the change in pH for a standard milk-based formula. With a pH of 3 defined as a germicidal pH, it required approximately 2.5 mL of acid to render 60 mL of standard formula germicidal compared to about 1.4 to 1.6 mL for the low buffer formulas and human milk. The difference in buffering capacity between reduced buffer formulas and standard formula correlated with germicidal capacity. Addition of 1.0 mL of acid to 60 mL of low buffer formula resulted in a decrease in the number of viable $V.$ $cholerae$ from about $1\times10^6$ to $1\times10^2$ while addition of a similar amount of acid to standard formula did not result in bacterial killing (FIG. 5). With the larger meal size (120 mL), a similar reduction in $V.$ $cholerae$ viability was observed following addition of 2.0 mL of acid to low buffer formula compared to about 3.5 mL of acid for standard formula (FIG. 6). Killing of *Salmonella typhimurium* was also greater with the low buffer formula (318) compared to high buffer formula following addition of constant amounts of acid (FIGS. 7 and 8). In summary, greater amounts of acid were required to effect the same level of germicidal activity in standard formula when compared to low buffer formulas and human milk.

EXAMPLE 5

Enhanced Gastric Barrier Function in Animals Fed Reduced Buffer Formula

The high buffer strength of infant formulas combined with the low output of gastric acid by the immature stomach of the infant suggest that the germicidal activity of gastric secretions may be compromised in formula-fed infants compared to breast-fed infants. The impact of formula buffer strength on in vivo germicidal properties of gastric secretions (ie. gastric barrier function) was evaluated by monitoring survival of a standardized bacterial inoculum following gastric transit in a mouse model of bacterial infection. Approximately 4×10⁶ colony forming units (CFU) of *Vibrio cholerae* were suspended in low buffer strength formula (LBF 318) or high buffer strength formula (Enfamil) and administered intragastrically to adult mice. The effectiveness of gastric barrier function was determined by monitoring recovery of test bacteria from the intestines of mice after 1 hour. Accurate quantitation of test bacteria was made possible by using a streptomycin variant of *V. cholerae* to differentiate test bacteria from normal indigenous intestinal bacteria. Saline was included as a low buffer control to demonstrate maximum killing of test bacteria by gastric secretions.

Figure 9:
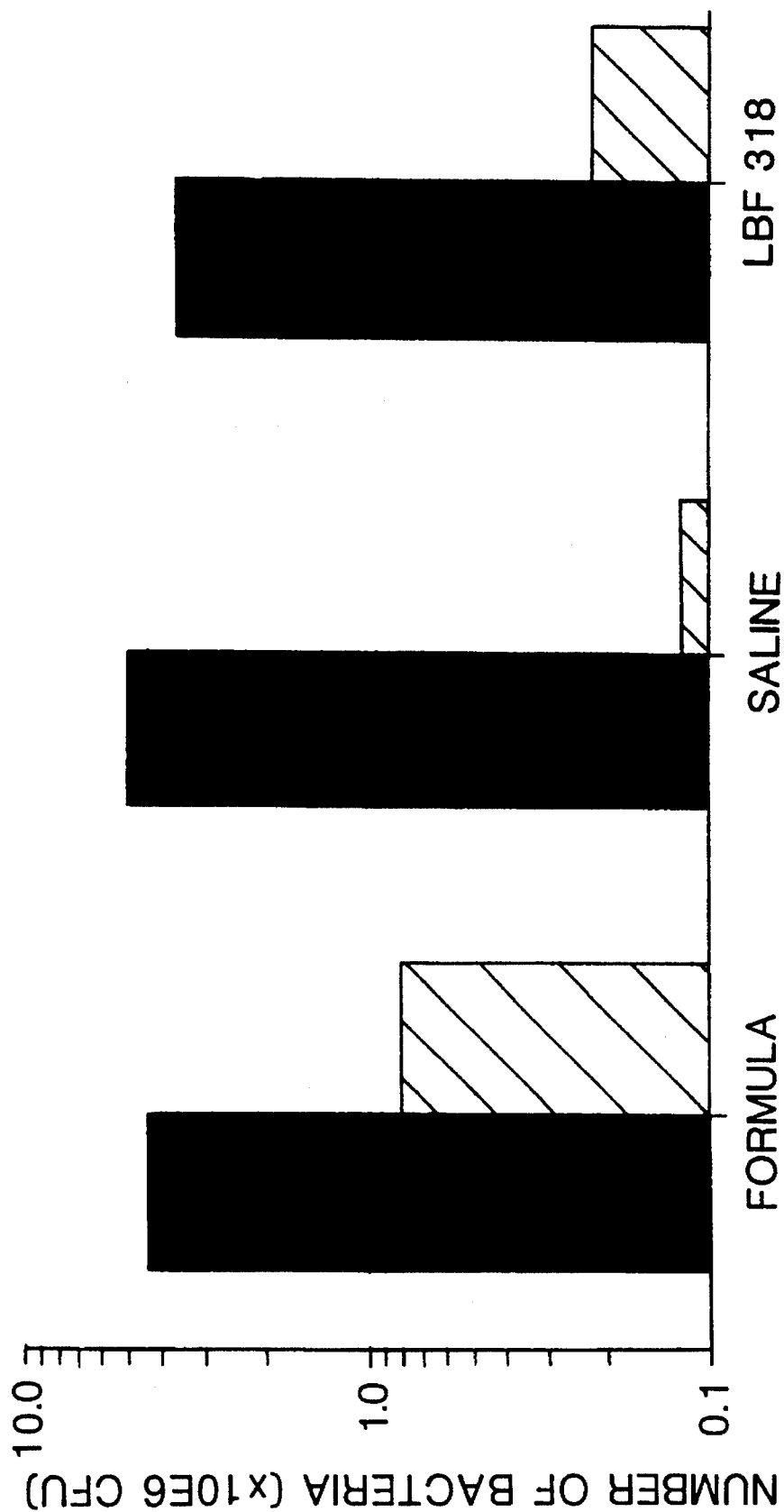
FIG. 9—The number of viable *V. cholerae* recovered from intestines of mice following intragastric inoculation in liquid test diets as described in Example 5. The solid bars represent the number of viable bacteria administered and the gray bars administered represent the number of bacteria recovered.

The number of viable *V. cholerae* recovered from intestines of mice following intragastric inoculation in test liquid diets is shown in FIG. 9. The data represent the mean log recovery of bacteria (CFU/mL) from stomach, small intestine and cecum of 8–10 mice. The total number of test bacteria recovered from mice in the water and low buffer strength formula groups was statistically lower than numbers recovered from mice in the high buffer strength formula group (Enfamil). The number of viable *V. cholerae* that were administered to mice ranged from 3–5×10⁶ CFU for each group (solid bars). The number of bacteria recovered from intestines of mice is shown in hatched bars. Approximately 9×10⁵ CFU of test bacteria were recovered from mice that received bacteria suspended in high buffer formula, indicating a 0.74 log reduction in viable cell numbers. Approximately 1–2×10⁵ CFU of test bacteria were recovered from mice that received bacteria suspended in low buffer formula or water, indicating about a 1.3 log reduction in viable cell numbers.

We claim:

1. A liquid, nutritionally complete infant formula or adult enteral composition having a buffer strength of 18 or lower.

2. The composition of claim 1 having a buffer strength between about 9 and 18.

3. The composition of claim 1 having a buffer strength between about 11 and about 16.

4. The composition of claim 1 having a buffer strength between about 12 and about 15.

5. The composition of claim 1 which comprises about 0.5 g to about 10.0 g protein, about 0.1 g to about 9.0 g lipid, and about 6.0 g to about 25.0 g carbohydrate, said percentages being based on 100 calories of the composition.

6. The composition of claim 1 which comprises about 1.0 g to about 8.0 g protein, about 0.2 g to about 8.0 g lipid, and about 7.0 g to about 22.0 g carbohydrate, said percentages being based on 100 calories of the composition.

7. The composition of claim 1 which comprises about 1.8 g to about 6.2 g protein, about 0.4 g to about 7.0 g lipid, and about 8.0 g to about 20.0 g carbohydrate, said percentages being based on 100 calories of the composition.

8. The composition of claim 5 which further comprises vitamins and minerals.

9. The composition of claim 6 which further comprises vitamins and minerals.

10. The composition of claim 7 which further comprises vitamins and minerals.

11. The composition of claim 1 having less than 0.5% citrates on a solids basis (w/w).

12. The composition of claim 1 having less than 0.25% citrates on a solids basis (w/w).

13. The composition of claim 1 having less than 0.1% citrates on a solids basis (w/w).

14. The composition of claim 5 wherein the protein comprises whey protein, caseinate, sodium calcium caseinate or protein hydrolysate, any of which optionally substituted with amino acids.

15. The composition of claim 1 wherein said composition is an infant formula.

16. A method for treating a subject in need of control of orally ingested pathogenic microorganisms comprising administering to said subject an effective amount of a liquid, nutritionally complete infant formula or adult enteral composition having a buffer strength of 18 or lower.

17. The method of claim 16 wherein said pathogenic organisms are bacteria, parasites or viruses.

18. The method of claim 16 wherein said composition has a buffer strength between about 11 and about 16.

19. The method of claim 16 wherein said composition has a buffer strength between about 12 and about 15.

20. The method of claim 16 wherein said subjects are human infants.

* * * * *